Figure 1:
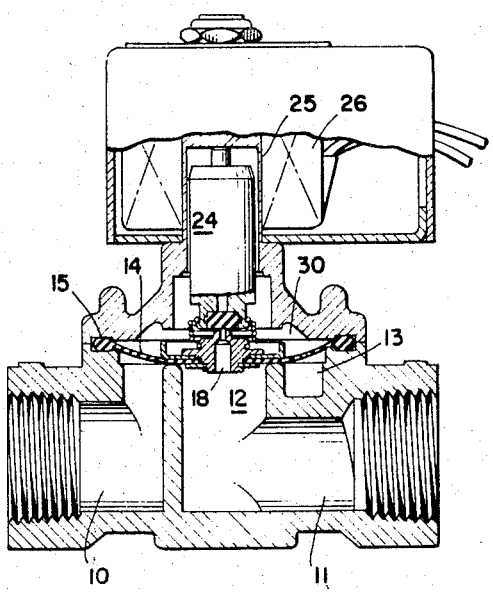

Sept. 28, 1965  A. H. ROLFE  3,208,716
SOLENOID-OPERATED PILOT-CONTROLLED VALVE
Filed Oct. 15, 1963

INVENTOR.
ALFRED H. ROLFE
BY *Frederick Breitenfeld*
ATTORNEY 3,208,716
SOLENOID-OPERATED PILOT-CONTROLLED VALVE
Alfred H. Rolfe, Glen Ridge, N.J., assignor to Automatic Switch Co., Florham Park, N.J., a corporation of New York
Filed Oct. 15, 1963, Ser. No. 316,368
1 Claim. (Cl. 251—30)

This invention relates generally to valves, and has particular reference to solenoid-operated valves for controlling the flow of fluids through pipes.

It is a general object of the invention to provide a solenoid valve in which the parts are so assembled and organized that it can satisfactorily cope with special industrial situations in which ordinary valves of comparable kind have heretofore failed to operate with full reliability.

For reasons of economic feasibility, reasonably sized solenoids are customarily used in commercial practice, and this means that, as a practical matter, direct-acting solenoid valves are restricted to uses in which relatively low pressure differentials exist between the fluid on the high and low sides of the valve. At higher pressures, pilot arrangements are usually resorted to, whereby only a low amount of power is needed to actuate the pilot, and the pilot thereupon conditions the parts so that the pressure of the fluid itself is harnessed to the opening of the main fluid passage, and when the main passage is to be closed the pilot establishes conditions under which the high pressure fluid keeps the main valve port closed.

A special problem arises when conditions of variable or fluctuating pressures are encountered. If a direct-acting solenoid-operated valve is employed, the solenoid may not be able to deliver sufficient power to open the valve under high-pressure conditions, and there is danger of burning out the solenoid winding. Conversely, in a pilot-operated solenoid valve installation, if the pressure differential drops too much it may become insufficient to control the opening and closing of the main valve port under the conditions established by the pilot.

The objective of the present invention is to provide a practical inexpensive device which can be reliably used for installations in which such variable fluid pressures are likely to occur.

The invention is particularly adapted to valves of the diaphragm type wherein the core of the solenoid is operatively connected to a diaphragm which is mounted to seat upon and lift away from the main valve port.

It is therefore a more specific object of the invention to provide a solenoid valve of the diaphragm type in which the parts are so designed and combined that the diaphragm will reliably open and close the main fluid passage whether the pressure differential is high or low. The improved valve is in fact of such a character that it will operate even under conditions of zero pressure differential.

Another object is to provide a valve of the character referred to wherein the solenoid core can complete its movement, when energized, regardless of whether the diaphragm is stuck or otherwise impeded, or reluctant to move because of a low pressure differential acting upon it. As a result, burning out of the solenoid winding is avoided.

Figure 2:
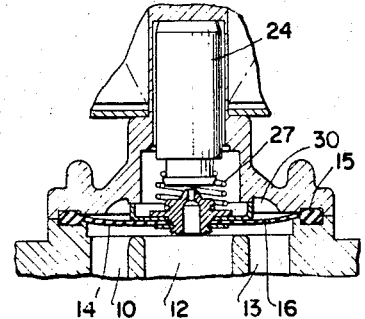
Figure 3:
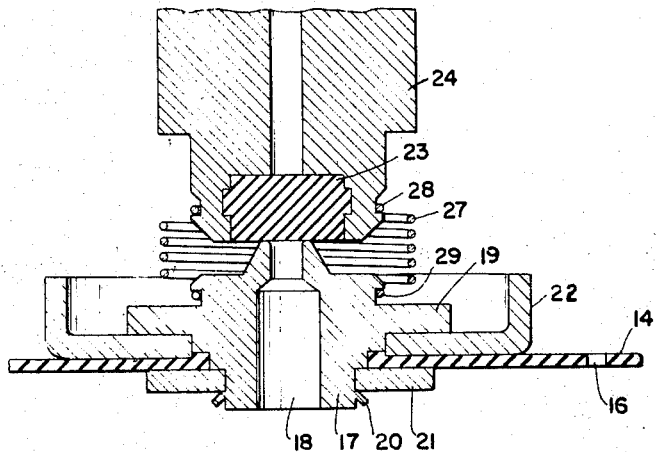

The preferred way of achieving these objects and advantages, and such other benefits as may be pointed out hereafter, is illustrated in the accompanying drawings, in which FIG. 1 is a cross-sectional view of a solenoid-operated diaphragm valve embodying the features of this invention, the valve being shown in its closed condition;

FIG. 2 is a fragmentary similar view showing the valve in its opened condition; and FIG. 3 is an enlarged view of the essential elements of the new assembly of parts.

The valve body chosen for illustration in FIGS. 1 and 2 has a high pressure chamber 10 and a low pressure chamber 11. The valve body is partitioned and contoured to provide a circular port 12 between them, the high-pressure chamber 10 including the annular region 13 surrounding the port.

The main fluid passage through the port 12 is controlled by the seating and lifting of a diaphragm 14 anchored along its periphery 15, in any suitable fashion, to the peripheral edge of the annular region 13. The diaphragm 14 has a bleed hole or passage 16 which communicates with the region 13.

At its midportion the diaphragm is secured to a rigid element 17 having a pilot passage 18 extending through it. The body 17 may be attached to the diaphragm in any suitable manner, and by way of example the drawings show the body 17 provided with a flange 19 on the upper side of the diaphragm, and a crimp 20 at the lower end, bearing against a retaining ring 21 on the lower side of the diaphragm. A cup-shaped element 22 is clamped into the assembly by the flange 19, and its upturned margin serves as a stop to limit the upward movement of the diaphragm as shown in FIG. 2.

The upper end of the element 17 is shaped to define a pilot-valve seat adapted to be sealed by a closure element 23 of appropriate material mounted in the lower end of the solenoid core or armature 24. This core is mounted, in known fashion, for reciprocating movements within the core tube 25, the latter being surrounded by the usual solenoid winding 26. When the solenoid is energized the core 24 moves upwardly into the tube 25, being stopped when it encounters the usual plugnut at the inner end of the tube. When deenergized, the core 24 is in the lowered position shown in FIGS. 1 and 3, whereby the pilot passage 18 is sealed off by the element 23.

A helical tension spring 27 is operatively interposed between the core 24 and the diaphragm 14. Its upper end may be secured to the core 24 as indicated at 28, and its lower end is secured beneath a shoulder on the element 17, as shown at 29.

The diaphragm 14 is of such shape and configuration that in its normal disposition it rests against the main port 12. When the valve is closed (FIG. 1), there is high-pressure fluid in the space 30 behind the diaphragm, because of the presence of the bleed passage 16. This fluid presses the diaphragm against the port 12 and keeps it closed.

When the valve is to be opened, an energization of the solenoid lifts the closure 23 from the pilot passage 18. Since this passage is considerably larger in area than the bleed hole 16, the high-pressure fluid behind the diaphragm is almost instantly exhausted to the low-pressure chamber 11, whereby the high-pressure fluid acting on the underside of the diaphragm in the annular region 13 exerts a lifting force upon the diaphragm to raise it off the port 12 and thereby open the main fluid passage. At the same time, a mechanical lifting force is applied to the diaphragm by the articulation afforded by the spring between the core 24 and the diaphragm 14.

When the valve is to be closed, the solenoid is deenergized and the closure 23 seats itself against the pilot valve seat to close off the pilot passage 18. At the same time, the diaphragm resumes its normal disposition and the parts thus return to the relationship shown in FIG. 1.

The spring 27 is a positive but yieldable connection between solenoid core and diaphragm. It is so selected, with respect to its strength, that if the diaphragm is stuck or impeded in any way, the spring will nevertheless allow the solenoid core 24 to move to the end of its stroke so that there will be no burning out of the solenoid winding. At the same time, the spring is adequately strong and unyielding to lift the diaphragm fully off of the valve port 12 if its reluctance to rise is due solely to low or zero pressure differential. Thus, under ordinary circumstances, with the diaphragm offering no resistance to the lifting force applied to it, the spring 27 by itself, even without the aid of any fluid-engendered lifting force, can raise the diaphragm fully and thereby open the main flow passage, when the solenoid core 24 is raised.

The improved valve will therefore function reliably under a wide variety of pressure variations or fluctuations. Moreover, since the solenoid core is always able to complete its movement, the mechanical force applied by it to the diaphragm increases in value as the core moves toward the region of maximum magnetic pull. Minor mechanical sticking of the diaphragm is thus minimized, and any resistance of the diaphragm against movement, due to sticking or otherwise, is counteracted to the maximum possible degree, and is in any case impotent to cause burning out or other impairment of the solenoid. These advantages are attained in addition to the economies stemming from the structural and operational simplicity of the device.

It will be understood that many of the details described and illustrated could be varied by those skilled in the art without necessarily departing from the spirit and scope of the invention as expressed in the appended claim.

What is claimed is:

In a solenoid valve:
(a) a valve body having a high-pressure chamber, a low-pressure chamber, and a port between them, the high-pressure chamber including an annular region surrounding said port,
(b) a valve member movable toward said port to close it, and liftable off of it to open it,
(c) a bleed passage between said annular region and the space behind the valve member so that when the port is closed there is high-pressure fluid behind the valve member urging it toward port-closing position,
(d) a pilot passage through the valve member at its midportion,
(e) a flange surrounding said pilot passage, fixed to said valve member and having a surface facing said port,
(f) a solenoid including a core mounted for movement to seal and uncover said pilot passage, the uncovering movement allowing exhaust of high-pressure fluid from behind the valve member,
(g) a flange surrounding the portion of said solenoid core which serves to seal the pilot passage having a surface facing away from said port, and
(h) a tension spring coaxial with said pilot passage and solenoid core, one end of said spring engaging the surface of said flange facing said port and the other end of said spring engaging the surface of said flange facing away from said port, whereby when said core moves away from said pilot passage said spring exerts a lifting force on said valve member, but said spring yields to permit continued movement of said core even if movement of said valve member is impeded.

References Cited by the Examiner

UNITED STATES PATENTS

| | | | |
|---|---|---|---|
| 1,302,538 | 5/19 | Gulick | 137—413 |
| 2,673,706 | 3/54 | Matteson | 251—30 |
| 3,103,338 | 9/63 | Marmo | 251—30 X |

M. CARY NELSON, *Primary Examiner.*